US008651714B1

(12) United States Patent
Hamasaki

(10) Patent No.: US 8,651,714 B1
(45) Date of Patent: Feb. 18, 2014

(54) PORTABLE LIGHTING DEVICE

(76) Inventor: Noriaki Hamasaki, Costa Mesa, CA (US)

( * ) Notice: Subject to any disclaimer, the term of this patent is extended or adjusted under 35 U.S.C. 154(b) by 499 days.

(21) Appl. No.: 12/886,396

(22) Filed: Sep. 20, 2010

(51) Int. Cl.
*F21V 1/00* (2006.01)
(52) U.S. Cl.
USPC .......................................................... 362/473
(58) Field of Classification Search
USPC ............. 315/224, 291, 307, 185 R, 294, 312; 362/473–476, 543–547; 340/432, 438, 340/463–464
See application file for complete search history.

(56) References Cited

U.S. PATENT DOCUMENTS

| 7,525,204 | B2 | 4/2009 | Kitamura | |
|---|---|---|---|---|
| 7,621,549 | B2 | 11/2009 | Van Houweling | |
| 7,625,108 | B1 | 12/2009 | Peterson | |
| 7,729,822 | B2* | 6/2010 | Le Gars et al. | 701/33.4 |
| 2004/0113385 | A1* | 6/2004 | Uno | 280/260 |
| 2007/0217212 | A1* | 9/2007 | Klinkman et al. | 362/493 |
| 2008/0068825 | A1* | 3/2008 | Harris | 362/105 |
| 2008/0080171 | A1* | 4/2008 | Lombard et al. | 362/106 |
| 2008/0211427 | A1* | 9/2008 | Budde et al. | 315/294 |
| 2008/0211428 | A1* | 9/2008 | Bayat et al. | 315/299 |

* cited by examiner

*Primary Examiner* — Minh D A

(57) ABSTRACT

A portable lighting device for illuminating a path engaged by a user, or enabling the user to be seen by other cyclists, pedestrians, motorists and the like is provided. Advantageously, the portable lighting device is small (configured to fit in the user's palm), light (configured to be comfortably attached to a user's bicycle frame, helmet or carried in the hand of the user) and durable (configured to be usable in any weather condition). In addition, the light is conveniently powered by an attachable battery pack and may store variable brightness and mode settings for versatile usage. Moreover, the light utilizes a EEPROM to store the user re-configured settings in conjunction with adjustably bright high-brightness LEDs ranging upwards of 3000 lumens to provide the user with an excellent lighting tool.

20 Claims, 19 Drawing Sheets

FIG. 7

| Setting #1: 100% | Setting #2: 75% | Setting #3: 50% | Setting #4: 25% |
|---|---|---|---|

FIG. 8

| Setting #1: Fast Flash | Setting #2: Slow Flash | Setting #3: Walking | Setting #4: SOS |
|---|---|---|---|

FIG. 9

| Bicycle Mode | Setting #1 - Not Programmable | Setting #2 - Programmable | Setting #3 - Programmable | Setting #4 - Programmable |
|---|---|---|---|---|
| Special Mode | Setting #1 - Programmable | Setting #2 - Programmable | Setting #3 - Not Programmable | Setting #4 - Not Programmable |

FIG. 10

| |
|---|
| Indicator 1~ 4 are ON = Setting #1 in Bicycle or Special Mode |
| Indicator 1~ 3 are ON = Setting #2 in Bicycle or Special Mode |
| Indicator 1~ 2 are ON = Setting #3 in Bicycle or Special Mode |
| Indicator 1 is ON = Setting #4 in Bicycle or Special Mode |

FIG. 11

| Indicator | Battery Level |
|---|---|
| Indicator Flicker | Battery Full to 1 Hour of Power |
| Indicator Fast Flash | Battery Has Less Than 1 Hour of Power |
| Indicator Slow Flash | Battery Has Less Than 20 Minutes of Power |
| Headlight Flashes | Battery Is Empty |

PORTABLE LIGHTING DEVICE

BACKGROUND OF THE INVENTION

1. Field of the Invention

The present disclosure is directed to a portable lighting device suitable for the general public. For example, a cyclist may benefit from the usage of the portable lighting device to illuminate their path and/or to ensure that he/she is visible to nearby pedestrians, other riders or motorists.

2. Description of Related Art

Currently in the world, literally a billion bicycles exist. Each year over a hundred million new bicycles are produced. The people that own and ride these bicycles range from recreation riders peddling for pleasure or health, professional riders racing for a career, or individuals who ride a bicycle as a primary form of transportation. Accordingly, the bicycling industry is constantly improving available technology so that riders can use their bicycles more efficiently, more safely and the like.

Conceivably, a substantial segment of bike riders use their bicycles after dark. Indeed, bicycle lighting remains an important aspect of bike riding. A good bicycle light serves many functions. For example, riders who otherwise would be afraid of being struck by a car because of not being seen may be encouraged to ride at night. Or, riders who otherwise would be concerned of riding their bicycles off the path and harming themselves may be less concerned with a strong light illuminating their path. Alternatively, some riders who use bicycles as a form of transportation may be able to pursue jobs that require travel at night. The possibilities that a bicycle light provides a rider is endless.

Bicycle light technology has been improving in recent years. More particularly, light-emitting diodes (LEDs) have become more and more popular with bike enthusiasts because of being able to provide the rider with increased lighting at a reduced size and weight. However, current bicycle lights powered by LEDs are still lacking in functionality. For example, as darkness falls, it would be advantageous for the light to get brighter and brighter, but in dusk or early nightfall, an overly bright light might not be efficient and may unnecessarily reduce battery life. Accordingly, there is a need for an adjustable portable LED-based light system that provides improved functionality.

SUMMARY OF THE INVENTION

A portable lighting device suitable for many functions, including but not limited to, serving as a bicycle light attachable to a frame of a bicycle to illuminate a path for the rider and/or to ensure that the rider is capable of being seen by other riders, pedestrians and/or motorists. Alternatively, the portable lighting device may be attached to a rider's helmet. Attachment to a helmet is advantageous in situations where the bicycle is broken during a ride and the user may have to walk to the nearest pay phone, gas station, and the like without the bike. In yet another embodiment, the user may be able to use the portable lighting device without the helmet and bike. For example, a pedestrian hiker may be able to attach the light to a shoulder strap of a backpack and use the portable lighting device to illuminate his/her surroundings at night.

In one aspect, the portable lighting device is a high-brightness LED lighting device specifically configured for cyclists. The light may comprise multiple high-brightness LEDs configured to output, for example, as little as 50 lumens and as much as 3000 lumens. The level of brightness and the expansive area illuminated may be suitable for all terrains. In one configuration, the portable lighting device includes a light module, a battery pack to power the light module, an attaching device configured to allow the portable lighting device to be attached to a helmet or bicycle handlebars (e.g., a mounting bracket or a slot receiving a Velcro strap). In one aspect, the light may be attached to the helmet or bike frame while the connecting battery may be attached to a different part of the bicycle, helmet, or stored on the rider.

In another aspect, the portable lighting device may include an outside casing made of aluminum, plastic and or silicon and may feature multiple vent holes and scoops to allow airflow to cool the portable lighting device during use. The casing may provide structure to attach the electronics which control the light, the high-brightness LEDs and regular-brightness LEDs used as indicator lights to inform the user whether the light is ON/OFF, mode, battery life and the like. In one example, two high-brightness LEDs and four indicator LEDs may be housed by the casing of the portable lighting device. The high-brightness LEDs may be focused by a collimator and reflector configured to provide a wide and far beam pattern. In addition the casing may protect the lighting and electronic components from damaging elements such as rain, wind, sand and the like by employing one or more silicon seals in various locations. In another aspect, the housing or casing may further include a port configured to receive a power cable connected to the battery pack. Alternatively, the power cable may be permanently attached to the casing of the portable lighting device.

The portable lighting device may further include external switches configured to allow a user to control and/or configure the functionality portable lighting device. In one example, two switches may accessible to the user and may be placed on the top side of the portable lighting device. In one aspect, one of the switches may be configured to control a portion of the functionality provided by the light, while the other switch may be configured to control the remaining functions. The switches may be connected to the circuit board of the portable lighting device and, based on the input, may trigger the processor and/or memory to perform one or more corresponding functions. In one aspect, the circuit board may include a microcontroller which includes an electrically erasable programmable read-only memory (EEPROM). Advantageously, the EEPROM may function to save any settings and/or modes configured by the user such that the settings/modes do not need to be reset after the portable lighting device is turned off and then back on. In other words, the EEPROM retains a setting either default or user-programmed until the user chooses to re-program the setting.

The portable lighting device may include two distinct modes, a bicycle mode and a special mode. Each mode may include four different settings. For example, the bicycle mode may include a "100% brightness" setting for maximum brightness of the high-brightness LEDs (e.g., 1000 lumens) as setting #1 under the bicycle mode, a "75% brightness" setting as setting #2 under the bicycle mode, a "50% brightness setting" as setting #3 under the bicycle mode and a "25% brightness" as setting #4 under the bicycle mode. The special mode may include a fast flash setting as setting #1 under the special mode, where the high-brightness LEDs flash 60 or more times per minute at a 50% brightness, a slow flash setting where the high-brightness LEDs flash 30-60 times per minute at 50% brightness as setting #2 under the special mode, a walking setting where the brightness is set at 4% of the maximum brightness level as setting #3 under the special mode and a "Save-Our-Ship" (SOS) setting configured to flash the high-brightness LEDs at 50% brightness in Morse code as setting #4 under the special mode.

The settings in the bicycle and special mode may be re-configured by the user. In one aspect, the user may decide to re-configure the "75% brightness" setting to be brighter. Here, the user may desire to increase the setting to 80% of the maximum brightness. Once the user adjusts the brightness level within the setting, the EEPROM may store the newly adjusted setting in place of the previous setting. Advantageously, the user only needs to re-configure the setting once and from then on, the memory stores the brightness setting so that whenever the user chooses that particular setting number, the re-configured settings are used in place of the default settings.

In one aspect, the user may adjust the settings by using the two switches. For example, the first switch may be a power switch (turns the light on/off) and may further serve as a scroll button between the different modes and different settings within a mode. The second switch may be a light adjustment button and may gradually increase or decrease the light until the user's satisfaction with the light output level.

In one aspect, the indicator LEDs may designate which setting within the bicycle mode or special mode is currently active. For example, the first setting within the bicycle mode is active if only the first indicator is lit, the second setting within the bicycle mode is active if only the second indicator is lit, and so forth. Alternatively, multiple lit LEDs may be used to distinguish between the settings.

In another aspect, the regular LEDs may further indicate a battery level. For example, a flickering LED of the regular LEDs may signal that the battery life is between full and 1 hour remaining, a fast flashing LED of the regular LEDs may signal that the battery life has between 1 hour and 20 minutes remaining, a slow flashing LED of the regular LEDs may signal that the batter life has less than 20 minutes remaining, and no flashing LEDs may indicate that the battery is empty.

The objects, features, aspects and advantages of the present disclosure, which are believed to be novel, are set forth with particularity in the appended claims. Moreover, these objects, features, aspects and advantages of the present disclosure will become apparent to those skilled in the art from the following detailed description, which, taken in conjunction with the annexed drawings, discloses a best mode.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 7 is a chart illustrating one example of the default settings of light brightness within the bicycle mode in accordance with one or more aspects described herein.

FIG. 8 is a chart illustrating one example of the default settings within the special mode in accordance with one or more aspects described herein.

FIG. 9 illustrates one example of a programming table which indicates which settings under the specific modes may be user-programmable and which settings might not be user-programmable in accordance with one or more aspects described herein.

FIG. 10 is a chart illustrating one example of indicator LEDs configuration settings in accordance with one or more aspects described herein.

FIG. 11 is a chart illustrating one example battery level indications in accordance with one or more aspects described herein.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
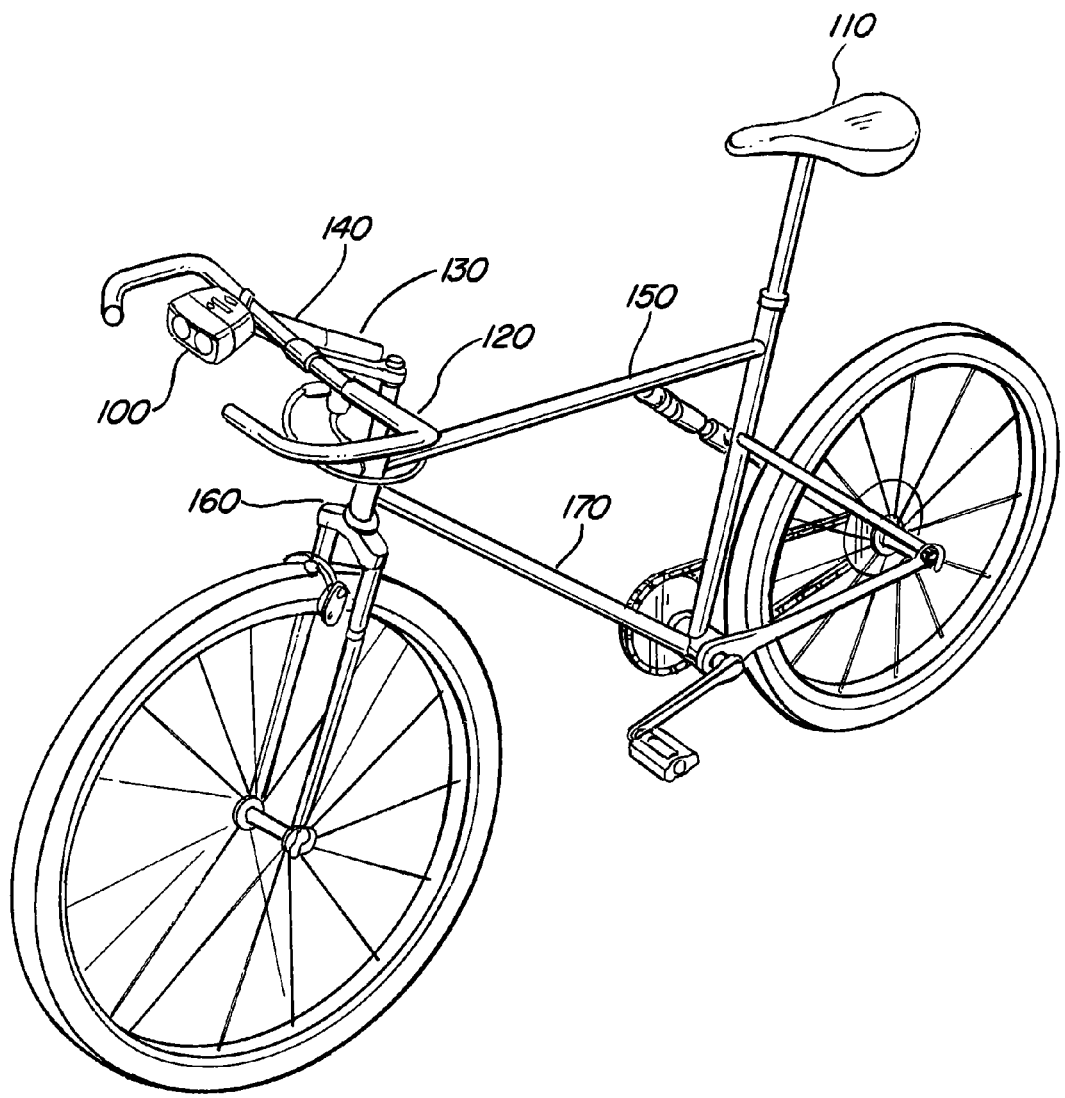
FIG. 1A illustrates an example of a portable lighting device attached to the frame of a bicycle in accordance with one or more aspects described herein.
Figure 1B:
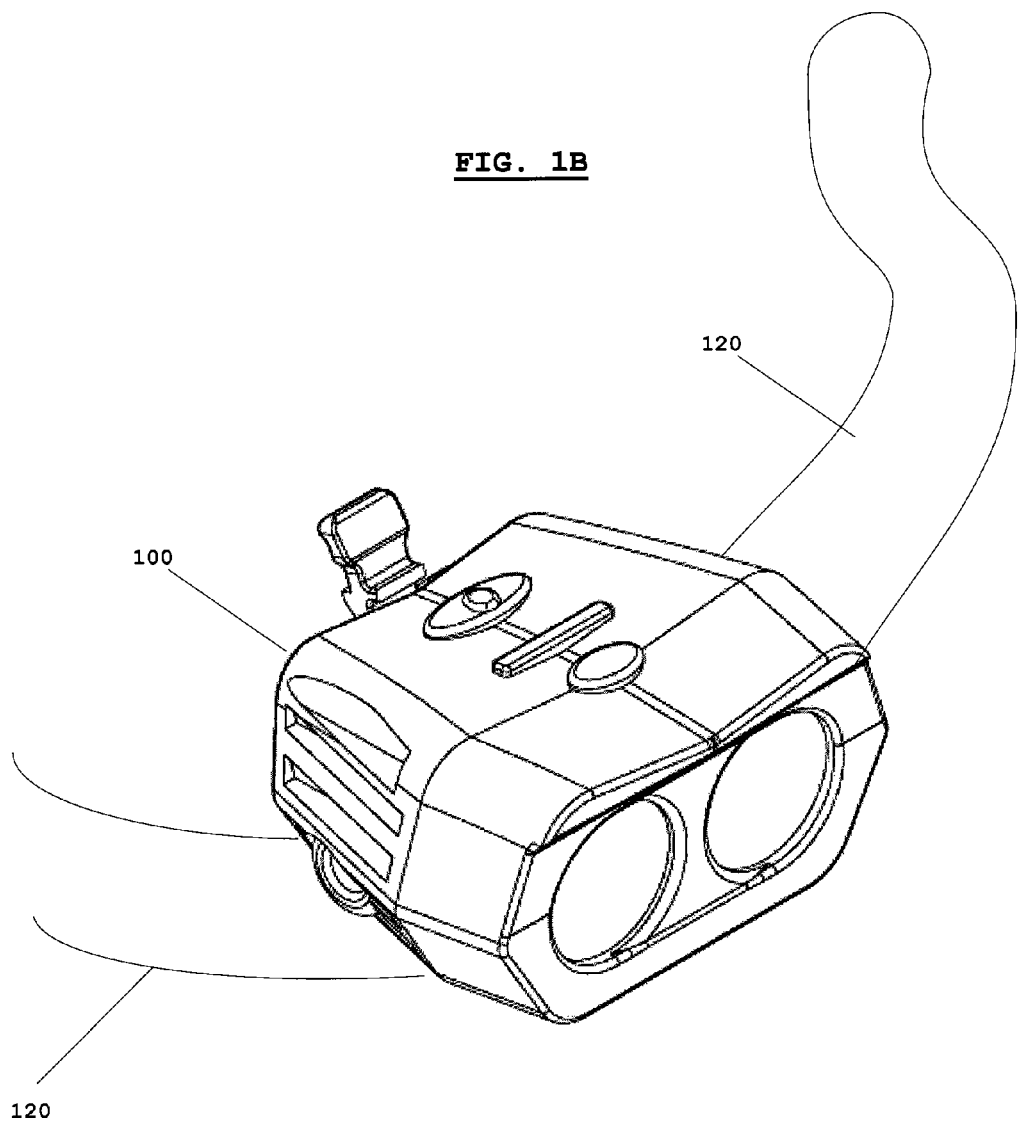
FIG. 1B is a close up view of a portable lighting device attached to the bicycle handle in accordance with one or more aspects described herein.

FIG. 1A illustrates an example of a portable lighting device 100 attached to bicycle 110. More particularly, the lighting device 100 is mounted on the handlebars 120 and further attached to battery 130 via wire 140. In this example, the wire 140 is short and connects light 100 to battery 130. The wire 140 may be constructed out of any one of a number of conductive materials, such as copper, silver, gold and the like. The wire may be covered in a sheath of non-conductive material such as rubber. The battery may be mounted to a different portion of the handlebars 120. As shown, the lighting device 100 would shine in a forward direction, illuminating the path for the rider. In one alternative, the portable lighting device 100 may be attached to the top tube 150 or head tube 160 and the battery may be attached to the top tube 150, head tube 160 or down tube 170. In another alternative, the portable lighting device 100 and the battery 130 may be attached to the same part of bicycle 100 (e.g., both attached to handlebars 120 or both attached to the top tube 150). FIG. 1B illustrates a close up view of portable lighting device 100 mounted on the handlebars 120.

Figure 1C:
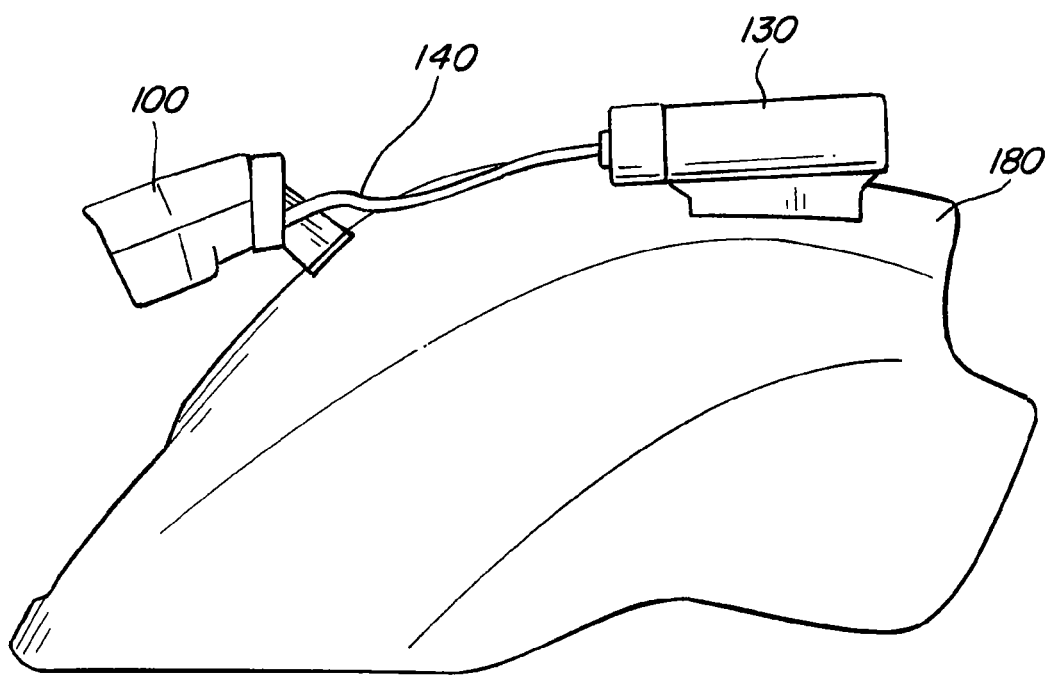
FIG. 1C is a side view of a portable lighting device attached to the top of a helmet in accordance with one or more aspects described herein.

FIG. 1C illustrates a side view of light 100 mounted on a helmet 180. Here, in this example, light 100 is mounted on the front, top side of helmet 180 and shines a light in front of the rider when the rider is wearing helmet 180. The battery 130 may be attached at the rear of helmet 180 and connected to the light 100 via wire 140. In this example, the lighting device 100 and battery 130 may be mounted on helmet 180 by using straps to connect the light to the outer frame of the helmet 180. Advantageously, by placing battery 130 at the rear of helmet 180, the weight of the lighting device 100 and the battery 130 may be evenly spread out providing the user comfort.

Figure 2A:
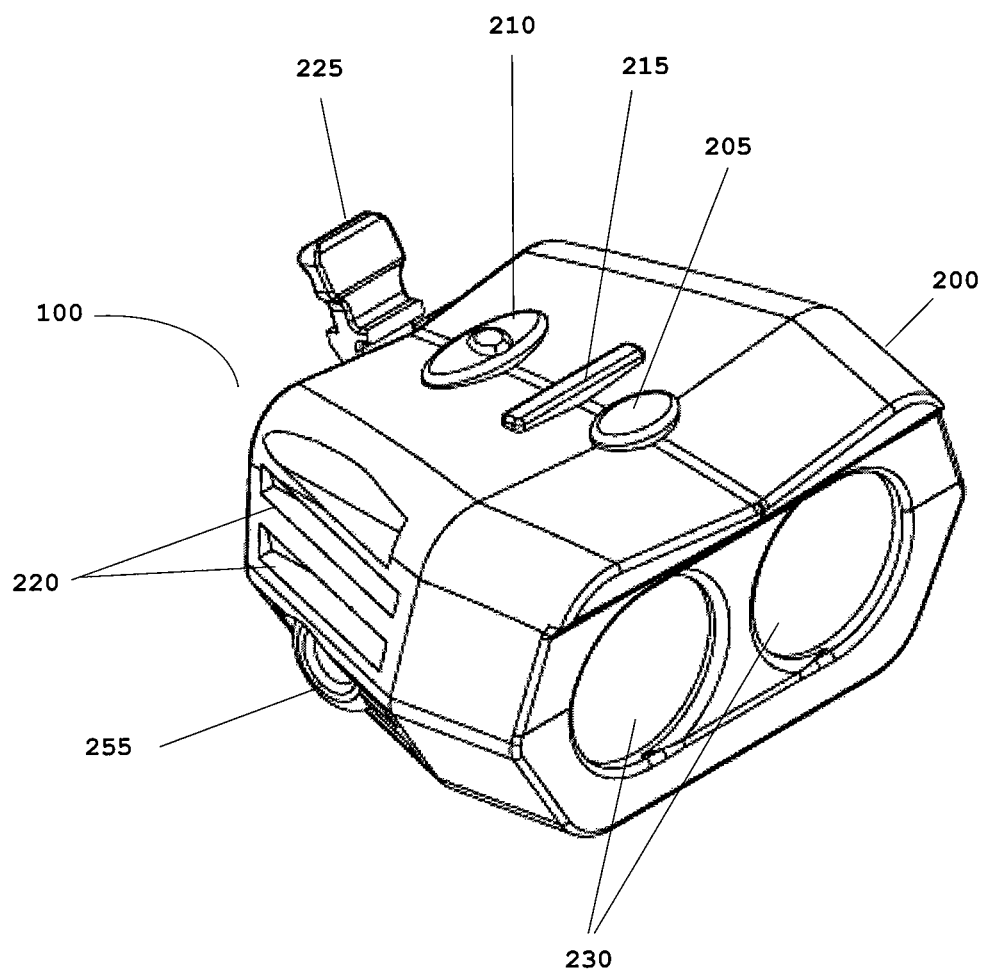
FIG. 2A is a top perspective view of a portable lighting device in accordance with one or more aspects described herein.

FIG. 2A is a front perspective view of the portable lighting device 100, shown unattached to a wire or battery. As shown, housing 200 of portable lighting device 100 is formed to fully encompass any circuitry required to operate light 100. On the top of housing 200 are two switches, 205 and 210. In one aspect, switches 205 and 210 may be implemented as any user input interface. For example, switches 205 and 210 may be a small, multi-directional joystick. In another example, user-input interface switches 205 and 210 may be buttons that a user can press down and hold. Upon release, switches 205 and 210 may return to its original position. In one example, the switches 205 and 210 may be raised to various heights and may be configured to be different shapes and sizes as one another such that the user may be able to determine which is the first switch 205 and which is the second switch 210 by quickly feeling the tops of the respective switches which have differently sized concentric circles. In addition, the user may be able to further distinguish the buttons by determining the raised levels of the respective switches and even by feeling the different shapes of the respective switches. As shown, button 205 has a smaller oval base, while button 210 has a small circular bump attached to a larger oval area. Accordingly, the user can easily distinguish between the two buttons using any of the multiple distinguishing features. Between these two switches, on the top side of light 100, may be a row of LEDs (not shown) housed underneath a clear or translucent piece of plexiglass, glass or plastic 215. The row of LEDs may be comprised of one or more LEDs. Advantageously, the user may also utilize any light given off by the LEDs to visually ascertain the difference between switch 210 and 205. That is, due to the placement of the LEDs underneath clear or translucent covering 215, light from the LEDs may illuminate switches 205 and 210. The housing 200 may further include a permanently or semi-permanently attached mounting bracket 225. Alternatively, the bracket 225 may be located elsewhere on housing 200 such as on the bottom of housing 200. Housing 200 may further include grooves or vents 220 on each side to provide airflow into and out of housing 200 to cool or otherwise regulate the heat of portable lighting device 100 when in use. As shown in FIG. 1, the front of the portable lighting device 100 may be two circular pieces of clear or translucent material 230. The two pieces of clear or translucent material 230 allows the light from high intensity LEDs to shine through and illuminate the terrain for the user. The clear or translucent material may be constructed out of glass, plastic or any other material known to provide protection to the high intensity LEDs while allowing the light to shine through with virtually no reduction in light intensity.

Figure 2B:
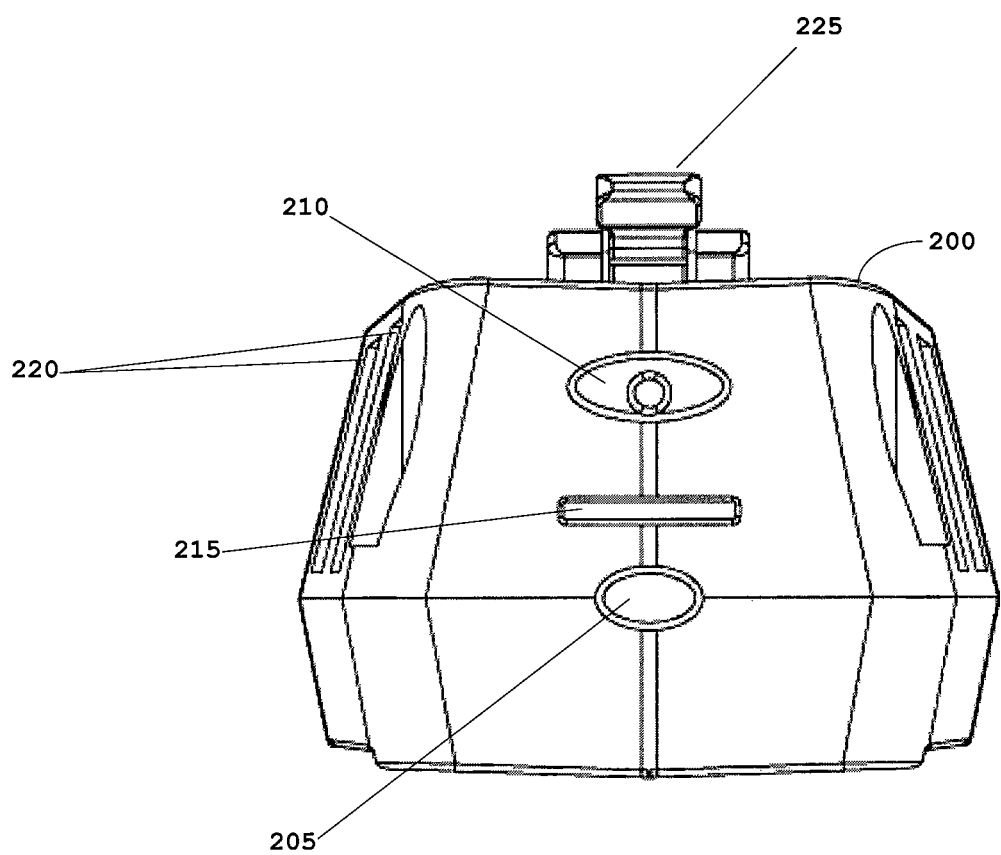
FIG. 2B is a top view of a portable lighting device in accordance with one or more aspects described herein.

FIG. 2B is a top view of portable lighting device 100. As shown, the different vents may be placed in various positions of the light, but generally parallel but in opposite of the direction of airflow when the light is in use (e.g., attached to the handlebars 120 as shown in FIG. 1A). Advantageously, positioning the vents as such may maximize airflow into and out of housing 200. Alternatively, the vents might not allow airflow to entire the inside of the housing. Instead, housing 200 may form a complete barrier between the internal circuitry and the external elements. Under this embodiment, the heat generated inside the lighting device 100 may be dissipated through the housing 200 itself.

Figure 2C:
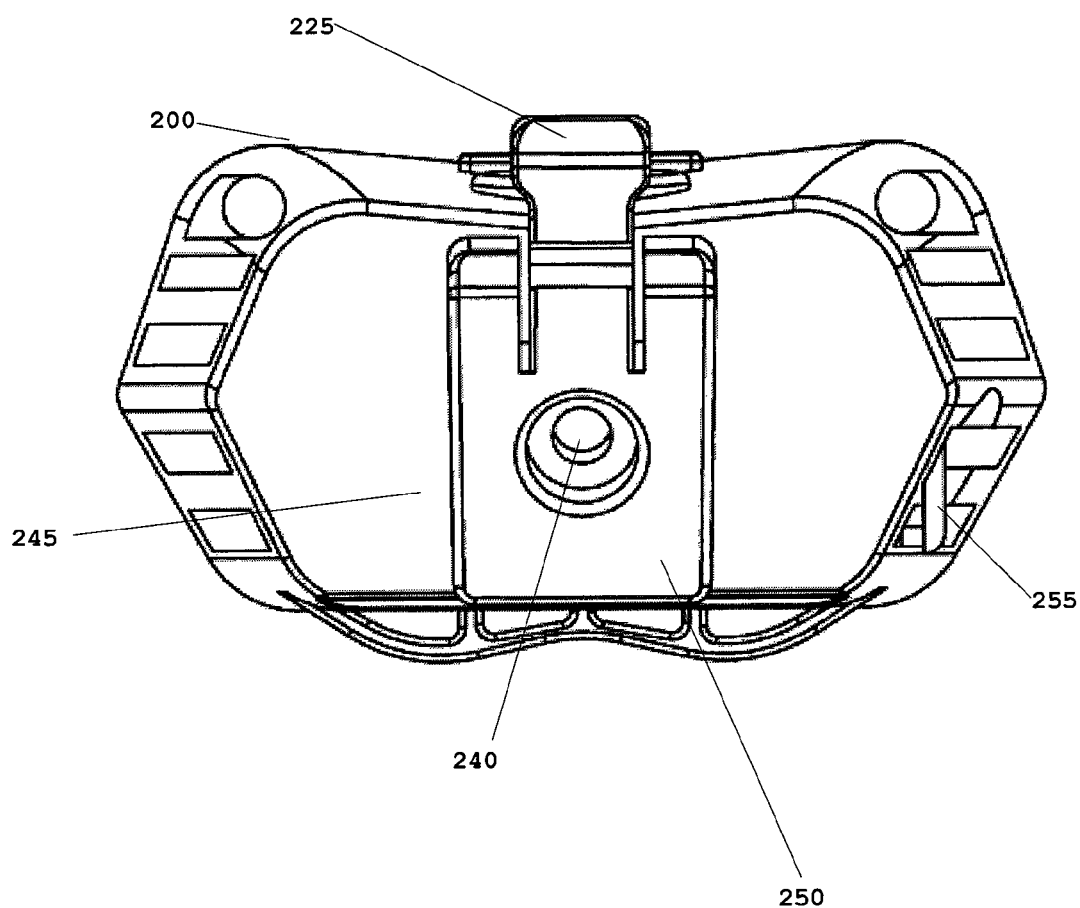
FIG. 2C is a back view of a portable lighting device in accordance with one or more aspects described herein.

FIG. 2C is a rear view of portable lighting device 100. Here, the mounting bracket 225 is illustrated to reside on the rear side of housing 200. In one example, the mounting bracket 225 is structurally attached to the housing 200 via attachment portion 240. As shown, with one side of the mounting bracket 225 attached to the housing 200, a clip 250 is formed to create an opening 245 such that a strap (not shown) or other attaching piece can interact with the clip 250 at opening 245 to fasten the housing 200 of the portable lighting device 100 to handlebars or a helmet (as shown in FIGS. 1B and 1C, respectively). Any of the plurality other known ways to attach two objects may be substituted or used in connection with mounting bracket 225 (e.g., via Velcro).

Figure 2D:
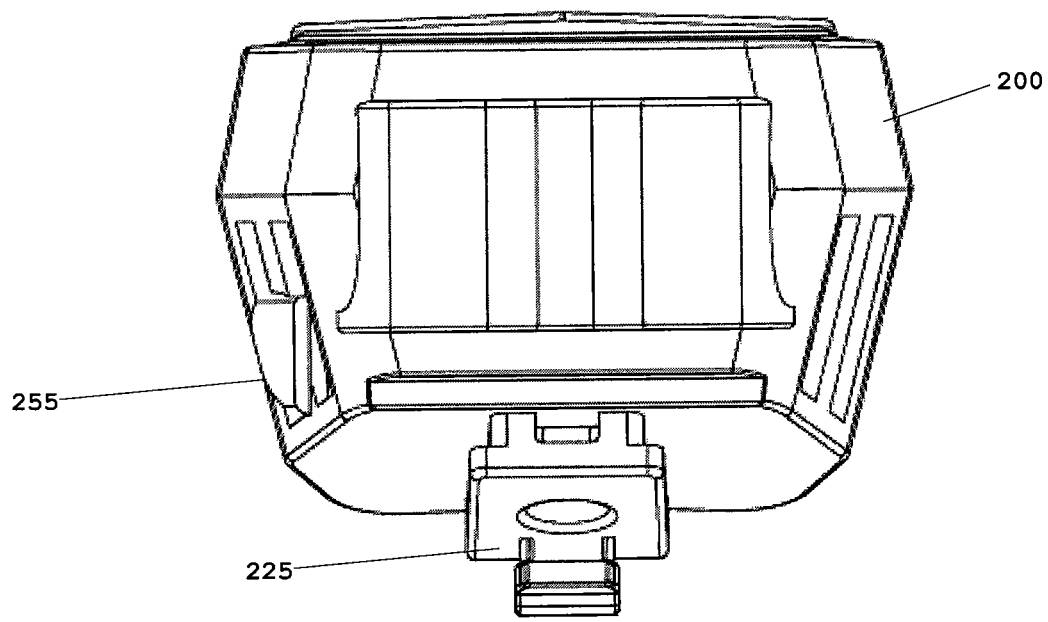
FIG. 2D is a bottom view of a portable lighting device in accordance with one or more aspects described herein.

FIG. 2D is a bottom view of the portable lighting device 100. As shown, a port 255 for allowing the portable lightening device to be connected to a battery is located on one side of the housing 200. In one aspect, port 255 may allow for direct access such that a connector to the wires (e.g., wires 140 as shown in FIG. 1A, 1B or 1C) may be insertably connected to port 255. Alternatively, port 255 may further include a removable cover (not shown) that the user removes to gain access to the port 255. In addition, any one of a number of attachments for transmitting power from a battery pack to an electrical device known to one skilled in the art may be substituted or used in connection with the embodiments described herein.

Figure 2E:
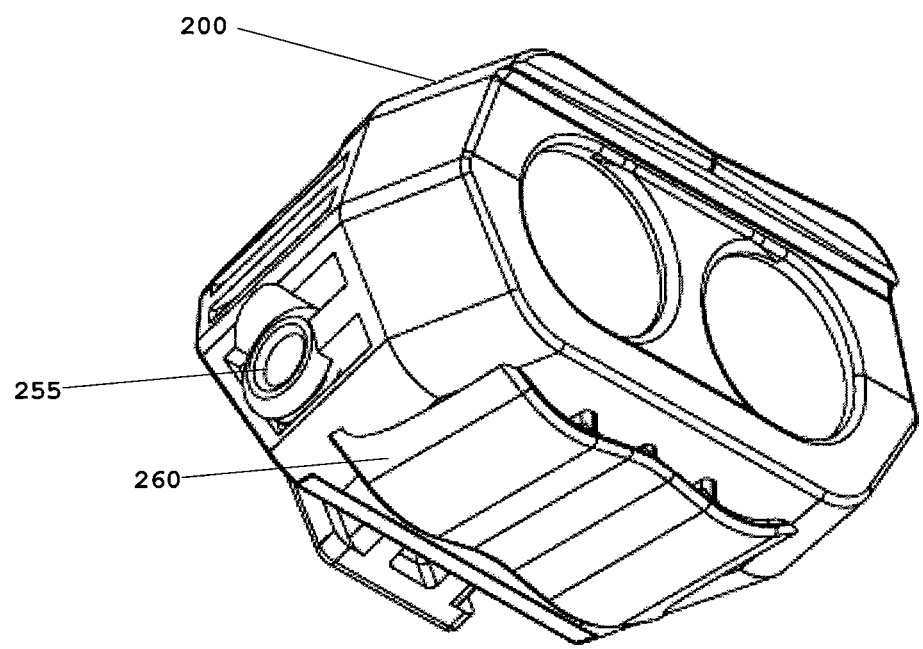
FIG. 2E is a port side perspective view of a portable lighting device in accordance with one or more aspects described herein.

FIG. 2E is a bottom perspective view of the port side of portable lighting device 100. As shown, portable lighting device 100 includes port 255 on one side of the housing 200. Port 255 may be recessed into the housing 200. Additionally, the portable lighting device 100 may include a stand portion 260. Stand portion 260 may be constructed out of plastic, aluminum or any other sturdy material able to withstand the weight of portable lighting device 100. In one aspect, stand portion 260 appears in a curvilinear configuration as two troughs joined by a crest having a length and width spanning the majority of the length and width of portable lighting device 100.

Figure 2F:
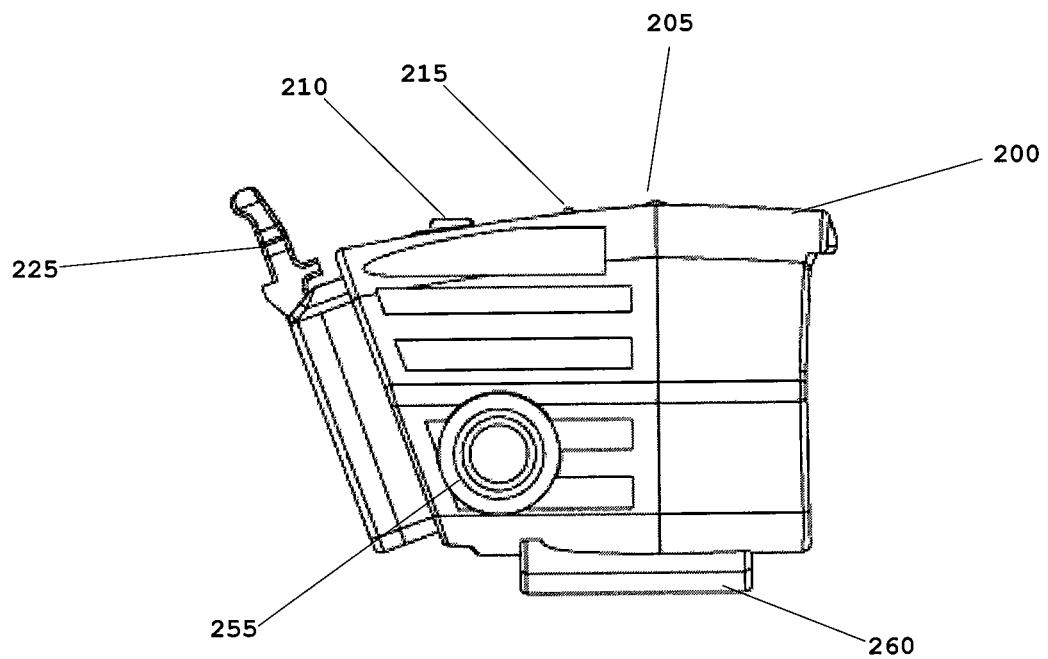
FIG. 2F is a port-side side view of a portable lighting device in accordance with one or more aspects described herein.

FIG. 2F is a side view of the port side of portable lighting device 100. From this view, in one example, the switches 205 and 210 are shown to be different shapes and heights. Here, switch 205 may be taller (e.g., protrudes out higher from housing 200 as compared to switch 210). As shown, the mounting bracket 225 may be slanted inwards and stand portion 260 may be sufficiently wide and long to keep portable lighting device from tipping over when placed on a flat surface. The port 255 for attaching the wire to the battery pack is also shown.

Figure 2G:
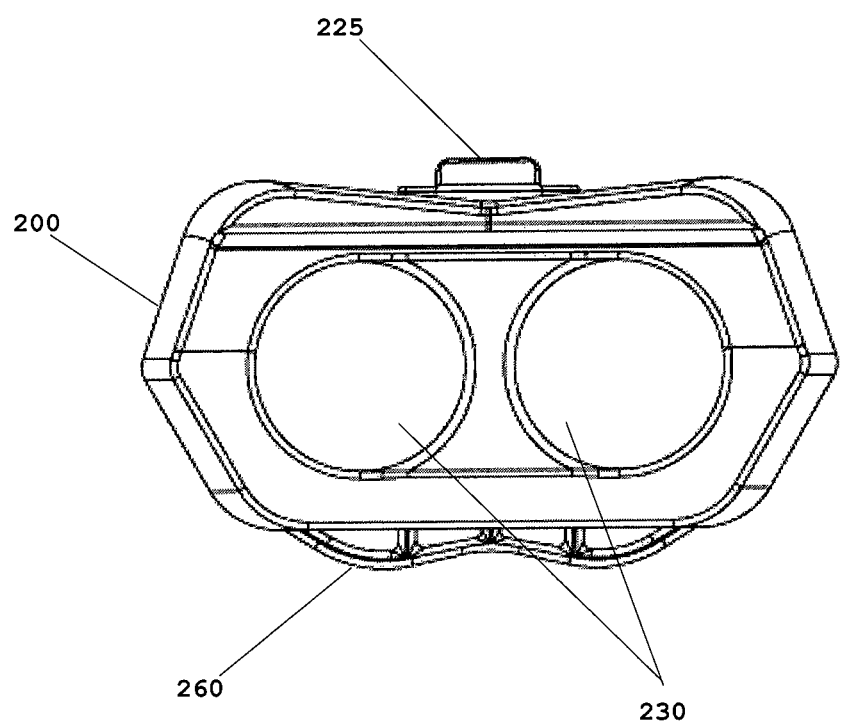
FIG. 2G is a front view of a portable lighting device in accordance with one or more aspects described herein.

FIG. 2G is a front view of the portable lighting device 100. As shown in this view, circular clear or translucent materials 230 protecting the high-brightness LEDs are sufficiently large enough to allow the light from the LEDs to shine through and provide the user with the desired level of brightness. In one aspect, a maximum brightness of 3000 lumens or more is achieved. In another aspect, the circular clear or translucent portions 230 further protect a collimator and reflector used to produce the light in a wide and far beam pattern.

Figure 2H:
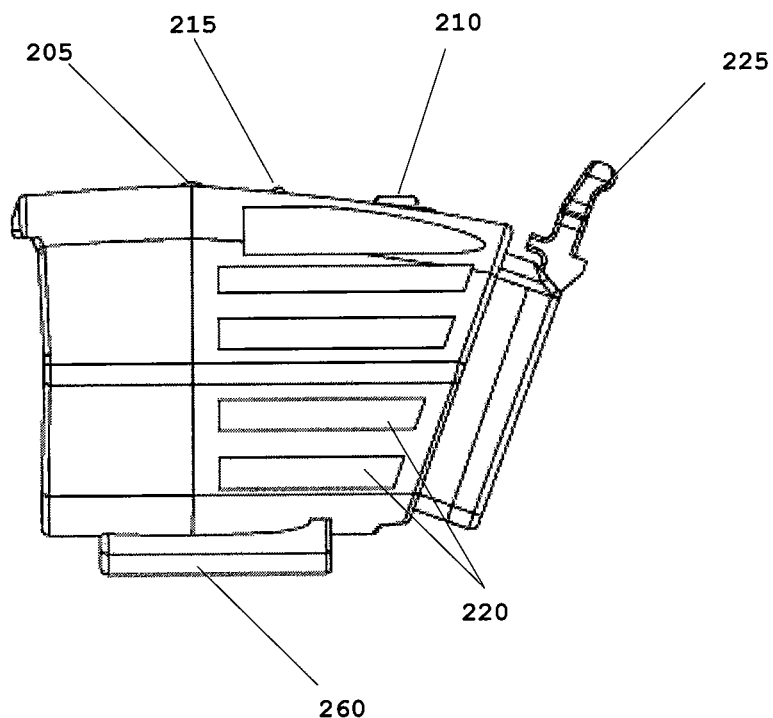
FIG. 2H is a non-port-side side perspective view of a portable lighting device in accordance with one or more aspects described herein.

FIG. 2H is a side view of the non-port side of portable lighting device 100. Since this side of housing 200 does not include the port for attaching the battery, two additional vents 220 are included. In one aspect, the additional vents allow for increased airflow and cooling of the electrical components within housing 200.

Figure 2I:
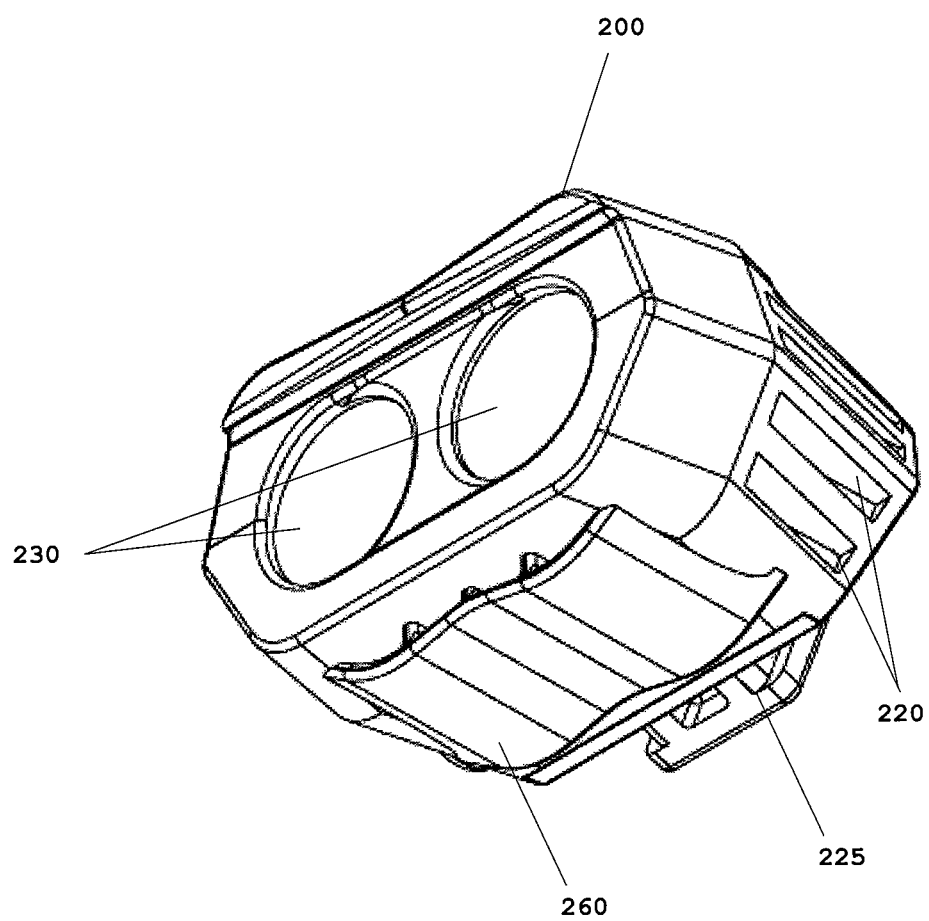
FIG. 2I is a non-port-side perspective view of a portable lighting device in accordance with one or more aspects described herein.

FIG. 2I is a bottom perspective view of the non-port side of portable lighting device 100.

Figure 3:
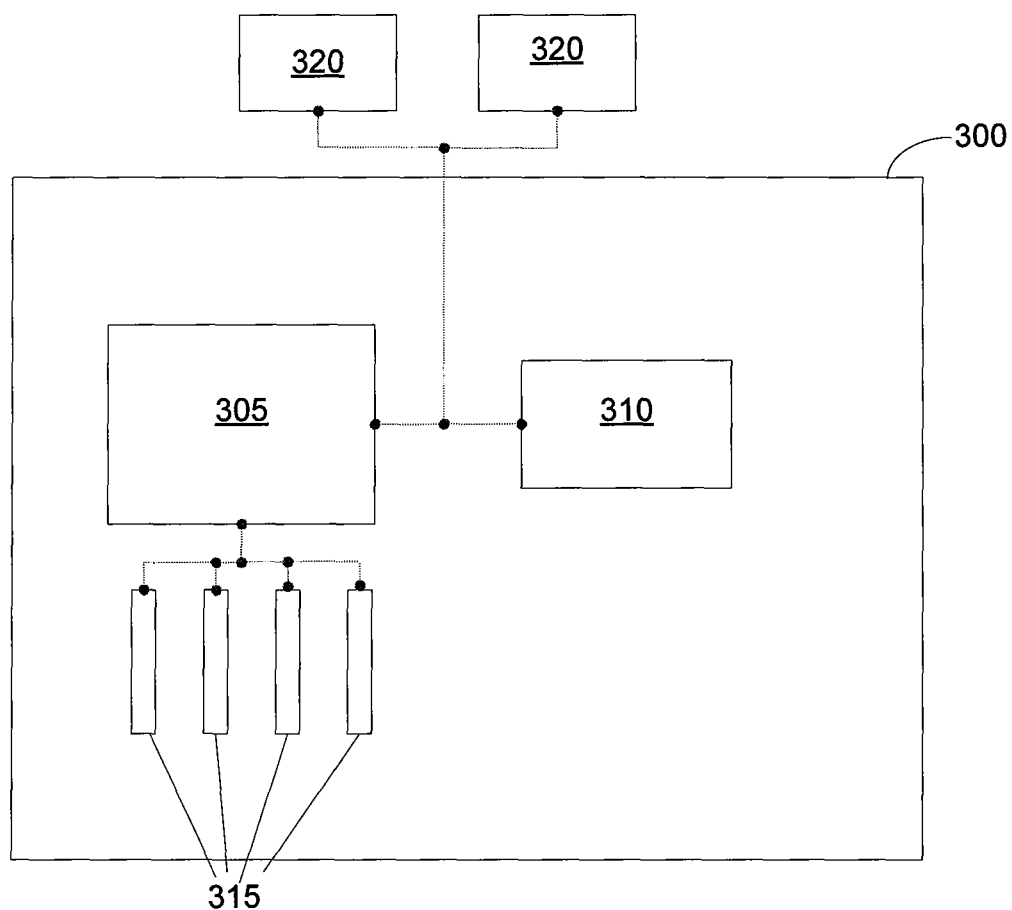
FIG. 3 is a block diagram of the controller in accordance with one or more aspects described herein.
Figure 4:
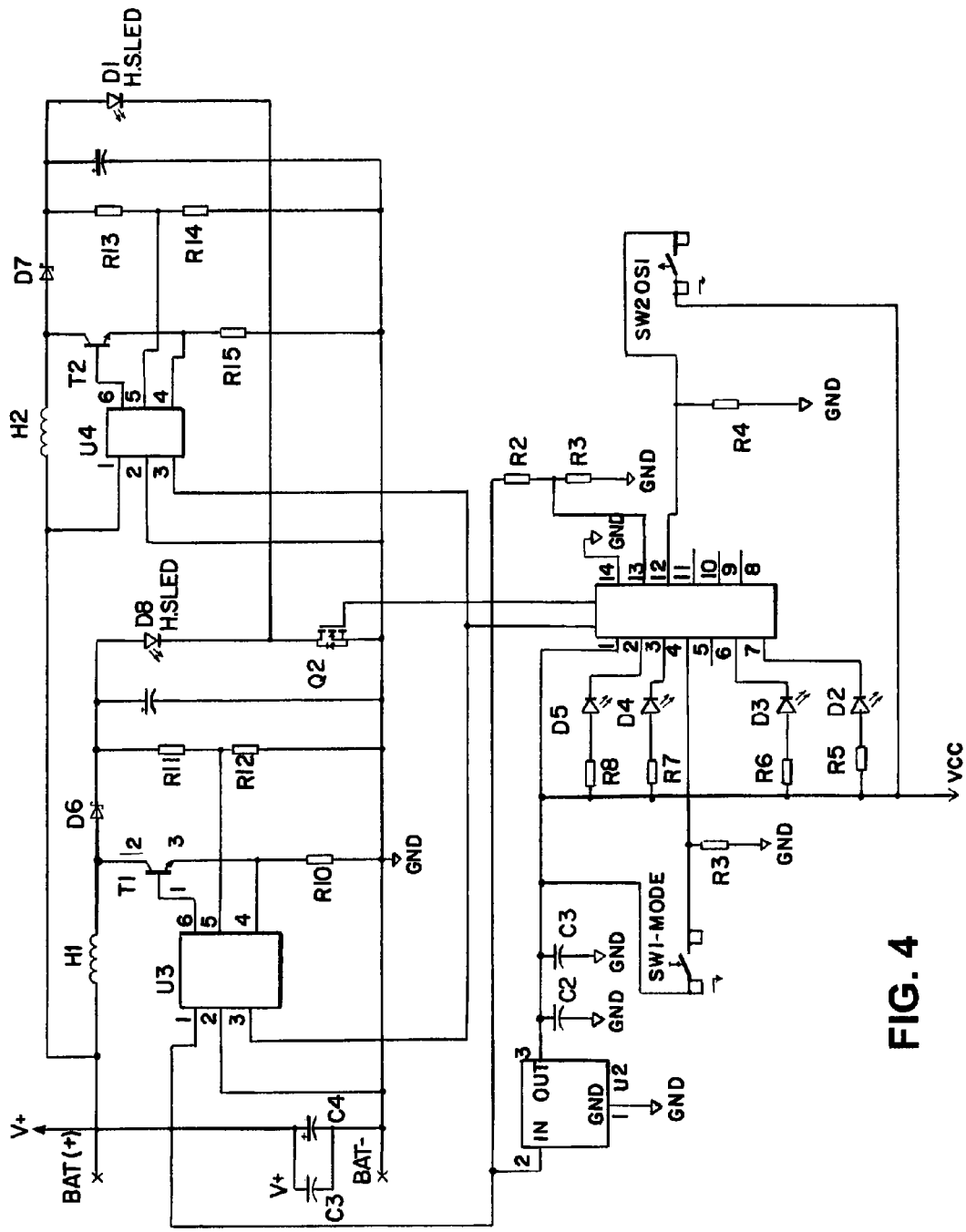
FIG. 4 is a schematic view of the circuitry of the portable lighting device in accordance with one or more aspects described herein.

FIG. 3 is a block diagram of the controller. In one aspect, the controller includes a microprocessor 305 coupled to a memory 310. Microprocessor 305 may be configured to execute commands stored in memory 310, and further configured to operate indicator LEDs 315 and high brightness LEDs 320 in response to user actuation of switches 205 and 210 as shown in FIG. 2A. In one aspect, LEDs 315 may be configured to be directly beneath clear or translucent shell 215 as shown in FIG. 2A, and the light of LEDs 315 may shine through shell 215 and be visible to the user. Along the same vein, high brightness LEDs 320 may be directly behind clear or translucent shells 230 of FIG. 2A and may shine through the shells 230 and be visible illuminate terrain and/or other objects. In one aspect, memory 310 may be a physical electrically erasable programmable read-only memory (EEPROM). In another aspect, memory 310 may be a flash memory. Advantageously, memory 310 may store programming code for operation of portable lighting device 100. For example, the memory 310 may store default settings for brightness and or flashing operation of the high brightness LEDs 320. However, when re-configured by a user pressing switches 205 and 210 of FIG. 2A, memory 310 may store the newly configured settings for brightness and/or flashing operations of the high brightness LEDs 320. Memory 310 may store the reconfigured settings permanently until the user decides to re-configure the particular setting again. Turning portable light ON and OFF and/or removing the battery power might not impact the storage of the reconfigured settings within memory 310. In one aspect, memory 310 may include a duplicate storage of the default settings such that the user may re-call the default settings and reset portable lighting device 100 back to factory default settings and overwrite the reconfigured stored settings within memory 310. In one aspect, memory 310 comprises two memory storage devices, for example, an EEPROM and a separate random access memory (RAM). Alternatively, the RAM may be a separate memory device altogether (not shown). FIG. 4 is a detailed operating schematic view of one example of circuitry of portable lighting device 100.

Figure 5:
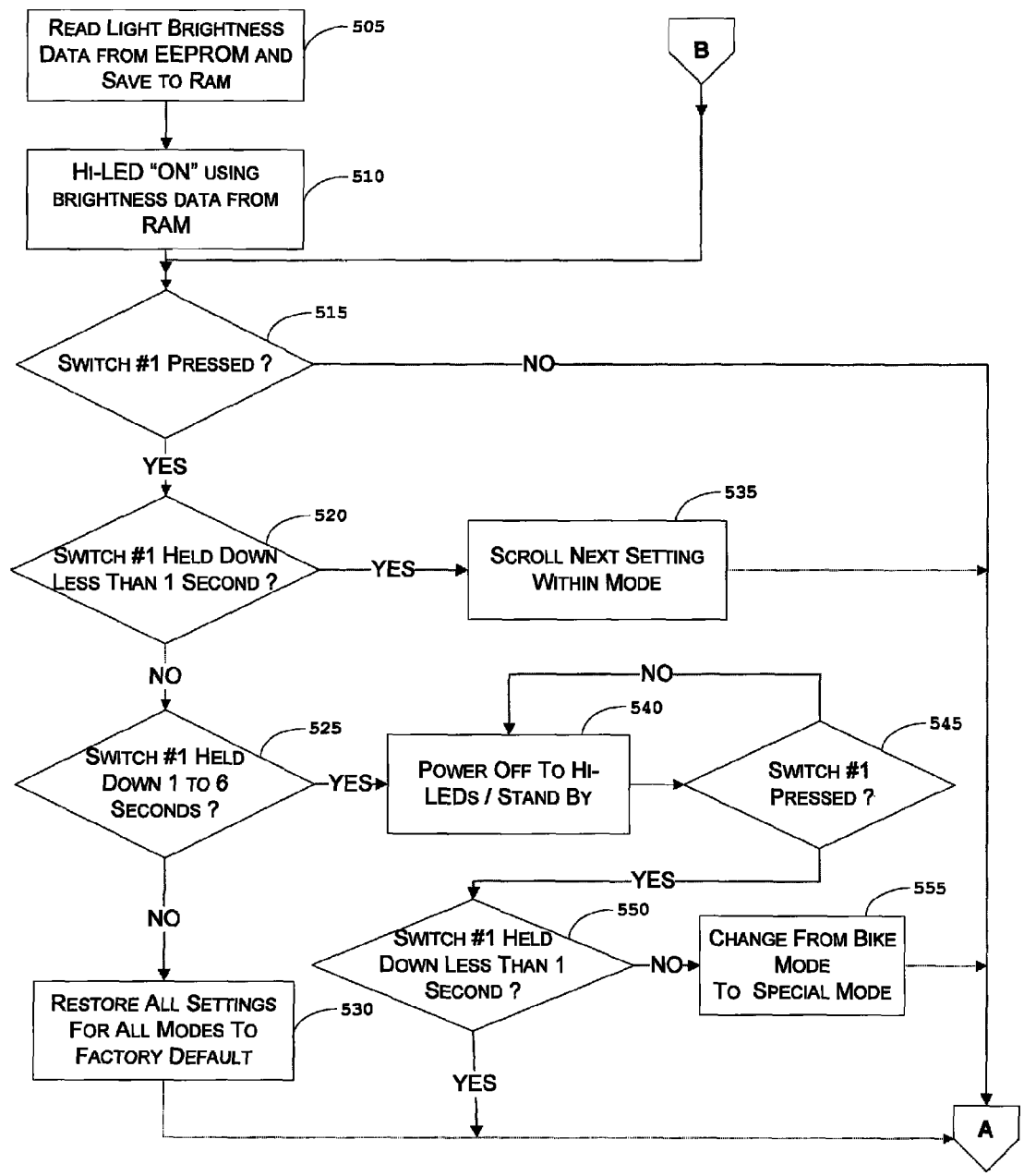
FIG. 5 is a flow chart illustrating one example of an operation to select a mode and a setting of the portable lighting device in accordance with one or more aspects described herein.

FIG. 5 is a flow chart illustrating one example of a method of selecting a mode and a setting of the portable lighting device. After portable lighting device is turned on (e.g., via detection of the user pressing switch 205 of FIG. 2A when the device is in an off mode), at step 505, the light brightness data is read from the EEPROM and saved to a separate memory, such as a RAM. The high brightness LEDs are then turned on and set to a brightness level matching the brightness data saved to the RAM at step 510. At step 515, the portable lighting device determines whether switch #1 (e.g., switch 205 of FIG. 2A) is pressed. If so, the process moves to step 520 to determine whether switch #1 was pressed for less than a second. Otherwise the process moves to step A (shown in FIG. 6). If switch #1 is pressed for less than a second, then the process moves to step 535 where the portable lighting device scrolls to the next setting within the mode. However, if the switch was held for more than a second, at step 525, the portable lighting device determines if switch #1 was held for 1-6 seconds. If so, then the high brightness LEDs are powered off or are placed in a stand-by mode at step 540 and await the user actuation of switch #1 again in step 545. If switch #1 is held for more than 6 seconds, then all factory defaults are reset at step 530.

Once switch #1 is pressed again at 545, a determination is made to see if switch #1 was held down for less than a second at step 550. If switch #1 is not held down for less than a second following step 545, the mode is toggled from a bike mode to a special mode (and vice versa). However, if switch #1 is held down for more than a second, the process moves to step A. As shown in the flow chart of FIG. 5, the process moves to step A following steps 530, 535 and 555 regardless, and also following steps 515 and 550 if certain conditions are met.

Figure 6:
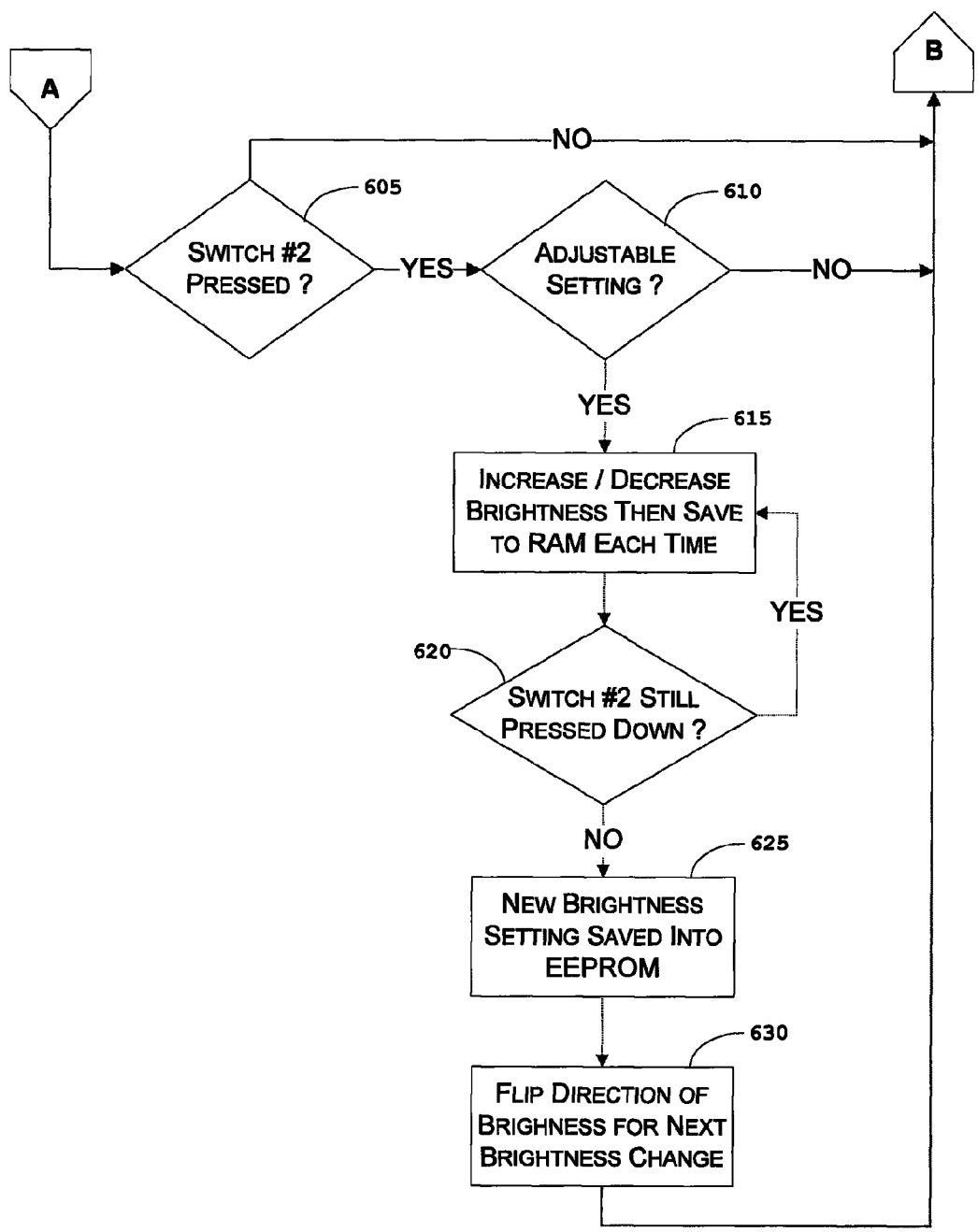
FIG. 6 is a flow chart illustrating one example of a method to adjust the brightness of a selected setting within an operation mode of the portable lighting device in accordance with one or more aspects described herein.

FIG. 6 is a flow chart illustrating one example of a method to adjust the brightness of a selected setting within an operation mode of the portable lighting device. Once the setting and mode are selected (e.g., according to the process shown in the flowchart of FIG. 5), the user may be able to actuate switch #2 (e.g., switch 210 of FIG. 2A) to reconfigure and/or adjust the brightness of the particular setting (e.g., following step A). At step 605, the portable lighting device determines if switch #2 is pressed. If not, the process proceeds to step B and determines if switch #1 is pressed. If switch #2 is pressed, the portable lighting device determines if the current setting is adjustable. If so, the process moves to step 615 where the brightness is adjusted and saved to the RAM. At step 620, the portable lighting device checks to see if switch #2 is still pressed down, and if so, the brightness is incrementally adjusted. Once the portable lighting device determines that the user is no longer pressing switch #2, the portable lighting device saves the new brightness level to the EEPROM at step 625 such that once the device is turned off and turned back on, the user does not have to reconfigure the light to achieve the current brightness level. At step 630, the portable lighting device flips the direction of brightness adjustment for the next brightness change (e.g., if the current adjustment is increasing brightness, the next adjustment is decreasing brightness, and so forth). At the completion of step 630, the process moves to step B. Additionally, if the setting is not adjustable as a result of step 610, then the process moves to step B preventing the user from adjusting the brightness level of the particular setting.

The factory default setting levels of brightness within the bicycle mode are illustrated in FIG. 7. As shown, default setting #1 is set at 100% of the maximum brightness levels (e.g., 1000 lumens). Advantageously, upon turning on the light, the user may have the maximum brightness available activated. Default setting #2 is set dimmer than setting #1 at 75% of the maximum brightness level. Default setting #3 is set dimmer than both setting #1 and setting #2 at 50% of the maximum brightness level. Default setting #4 is set at the dimmest level of the 4 settings within bicycle mode, at 25% of the maximum brightness levels. In one aspect, the default settings are pre-set at 25% within each other such that the user may save time adjusting the various settings. However, should the user desire, he/she may set any of the settings at any brightness level. For example, the user may wish to set reconfigure setting #2 to be 20%, setting #3 to be 80% and leave setting #4 at 25%. Alternatively, the user may desire to set all 4 settings at 100%. The possibilities are endless. In one aspect, the portable lighting device may be adjusted in 0.4% increments between 100% of maximum brightness and 5% of maximum brightness. The incremental adjustment, while discussed herein is set at a constant 0.4%, may be configured to be any constant adjustment level. Alternatively, the increment gaps may increase when a certain threshold is surpassed (e.g., once the brightness level goes above 90%, the next increment may be 1.0%, and the subsequent increment may be 5%).

FIG. 8 is a chart illustrating one example of the default settings within the special mode. Setting #1 is a fast flash mode where the high brightness LEDs flash over 60 times per minute at a pre-determined brightness level (e.g., 1000 lumens). Setting #2 is a slow flash mode where the high brightness LEDs flash under 30 times per minute at the same or different pre-determined brightness level. Setting #3 is a walking mode where the high brightness LEDs might not flash, but instead is set at an appropriate brightness level for walkers. Setting #4 is a "Save-Our-Ship" (SOS) mode where the high brightness LEDs are set to flash in a morse code based pattern. In one aspect, the brightness levels of each of the 4 settings of the special mode may be configurable. Alternatively, the brightness levels of only the two flash modes (e.g., Setting #1 and #2) are reconfigurable, while the walking and SOS modes are not reconfigurable. In another alternative, the brightness level of the flash might not be reconfigurable, but the speed of the flash (e.g., flashes per minute) may be adjustably increased or decreased using the same method of adjusting the brightness as illustrated in FIG. 6. In another aspect, the brightness may be adjustable in bicycle mode and the speed of the flashes may be adjustable in special mode.

FIG. 9 illustrates one example of a programming table which indicates which settings under the specific modes may be user-programmable and which settings might not be user-programmable. As shown, setting #1 under the bicycle mode, and setting #3 and #4 of the special mode are not user-programmable, while each of the remaining settings of the two modes are user-programmable.

Turning to the indicator LEDs (e.g., LEDs 315 of FIG. 3), a variety of different information may be conveyed to the user based on which of the LEDs are lit. FIG. 10 is a chart illustrating one example of indicator LEDs configuration settings to indicate which setting within a particular mode is active. While it may be easy for a user to distinguish between the bicycle mode and special mode because of a constant light and a flashing light, it might not be as simple for the user to ascertain the different settings within a mode (e.g., distinguishing between setting #2 of 75% of maximum brightness and setting #3 of 50% of maximum brightness within the bicycle mode). Accordingly, a LED configuration system is provided so that the user can quickly ascertain which setting is active. In one example, setting #1 may be indicated when all 4 indicator LEDs are lit, setting #2 may be indicated when only the first 3 indicators are lit, setting #3 may be indicated when only the first 2 indicators are lit and setting #4 may be indicated when only one indicator is lit. However, any of a number of lighting schemes may be possible. In one aspect, as the user is selecting the settings, the indicator LEDs lighting configuration may be changed in response to the user selecting the setting (e.g., in response to step 530 of FIG. 5).

In addition, the indicator LEDs may serve a second function. For example, the indicator LEDs may also indicate remaining battery life of the attached battery pack (e.g., battery pack 130 of FIG. 1A or 1B). FIG. 11 is a chart illustrating one example battery level LED indications. As shown, when the LED(s) are flickering, the battery life is between "full" and "1 hour left." When the LED(s) are flashing quickly, the battery life is between "1 hour left" and "20 minutes left." When the LED(s) are flashing slowly, the battery life remaining is estimated to be "less than 20 minutes" left. When the LED(s) cease to flash and the high intensity LEDs flashes, the battery is empty. In another aspect, the indicator LEDs may perform both indicating the setting and indicating battery life simultaneously. For example, when the current setting is bicycle mode setting #1, and the battery is full, all 4 LEDs may be lit and flickering. And when the setting is special mode setting #4, and the battery has less than 20 minutes left, only 1 indicator LED may be lit and slowly flashing. In one aspect, the battery pack may include a 4-cell Lithium-Ion battery with a safety circuit board.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

When any such inclusion or deletion occurs, the specification is deemed to contain the group as modified thus fulfilling the written description of all Markush groups used in the appended claims.

Certain embodiments of this disclosure are described herein, including the best mode known to the inventor. Of course, variations on these described embodiments will become apparent to those of ordinary skill in the art upon reading the foregoing description. The inventor expects skilled artisans to employ such variations as appropriate, and the inventor intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, references may have been made to patents and printed publications in this specification. Each of the above-cited references and printed publications are individually incorporated herein by reference in their entirety.

Specific embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments as disclosed so claimed are inherently or expressly described and enabled herein.

In closing, it is to be understood that the embodiments of the disclosure herein are illustrative of the principles described. Other modifications that may be employed are within the scope of the invention. Thus, by way of example, but not of limitation, alternative configurations of the present invention may be utilized in accordance with the teachings herein. Accordingly, the present disclosure is not limited to that precisely as shown and described.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A portable lighting device configured to be attachable to a helmet or bicycle frame, comprising:
   a housing configured to fit within the palm of a hand, and further includes a slot for attachment to the helmet or bicycle frame, and one or more air vents in the housing to provide air flow to an interior of the housing for cooling;
   a pair of high brightness light-emitting diode sets (Hi-LEDs) are contained within the housing to project light from a front surface of the housing, while being cooled by air flow from the one or more air vents;
   one or more regular light-emitting diodes (LEDs) contained within the housing to project light from an upper exterior surface of the housing;
   electrical circuitry including a processor and a memory, the electrical circuitry is contained within the housing and is configured to operate respectively the Hi-LEDs and the regular LEDs; and
   two user-input interfaces configured to be operatively mounted on the upper exterior surface of the housing adjacent the regular LEDs,
   wherein the memory is an electrically erasable programmable read-only memory (EEPROM) storing two or more brightness level settings for the Hi-LEDs, including a bicycle mode of operation and a special non-bicycle mode of operation,
   further wherein the EEPROM is configured to be reprogrammable by a user to store at least one different brightness level settings for the Hi-LEDs in response to the user operating at least one of the user-input interfaces and the Hi-LEDs can provide a brightness of at least 1000 lumens.

2. The portable lighting device of claim 1 further comprising:
   a port on the exterior of the housing configured to receive an elongated cable connector attached to a battery pack.

3. The portable lighting device of claim 2 further comprising:
   the battery pack is configured to be connectable to the port and further configured to supply power to the portable lighting device from a position apart from the housing when mounted on the bicycle frame.

4. The portable lighting device of claim 1, wherein the one or more LEDs are configured to indicate the selected brightness level of the Hi-LEDs, and wherein the maximum lumens of the Hi-LEDs in combination is at least 1500 lumens and a bottom surface of the housing includes a stand portion of a curvilinear configuration spanning a majority of the length and width of the housing member.

5. The portable lighting device of claim 4, wherein the EEPROM is further configured to store a bicycle mode a operation and a special non-bicycle mode of operation, wherein the bicycle mode comprises the two or more brightness levels, and wherein the special mode comprises one or more user-selectable flash modes, user walking modes and emergency modes.

6. The portable lighting device of claim 5, wherein one of the user-input interfaces is configured to power on the lighting device, scroll between the bicycle mode and special non-bicycle mode, scroll among brightness levels when in bicycle mode and scroll among the user selectable one or more flash modes, the user walking mode and the emergency mode, and wherein at least a different one of the user-input interfaces is configured to gradually increase or decrease the brightness of the Hi-LEDs.

7. The portable lighting device of claim 1, wherein the one or more LEDs are configured to indicate the selected brightness level of the Hi-LEDs, and wherein the maximum lumens of the Hi-LEDs in combination is at least 3000 lumens.

8. The portable lighting device of claim 1, wherein the one or more LEDs are configured to indicate the selected brightness level of the Hi-LEDs, and wherein the maximum lumens of the Hi-LEDs in combination is between 1 and 1500 lumens,
   wherein one of the pair of Hi-LEDs provides a projected wide beam of light and the other of the pair of Hi-LEDs, provides a narrow far beam of light.

9. The portable lighting device of claim 1, wherein one of the user-input interfaces includes a button configured to incrementally adjust the brightness of the selected light setting in a first direction towards 100% of a maximum light setting in response to determining that the user is pressing and holding the button.

10. The portable lighting device of claim 9, wherein the button is configured to incrementally adjust the brightness of the selected light setting in a second direction towards 0% of a maximum light setting in response to determining that the user is pressing and holding the button for a predetermined time period.

11. The portable lighting device of claim 1, wherein at least one saved light setting within a first mode and a second mode is configured to be replaceable by an adjusted light setting, and wherein at least one saved light setting within the first and second mode is configured to not be replaceable by an adjusted light setting.

12. The portable lighting device of claim 1 further including a mounting bracket attached to an exterior rear surface of the housing and extending above the upper exterior surface of the housing and configured to be removably attached to a clip for attachment to a bicycle handlebar or the helmet.

13. The portable lighting device of claim 1 wherein the regular LEDs provide indications of operation of the two user-input interfaces and further illuminate the surface of the two user-input interfaces.

14. A portable lighting device configured to be attachable to a helmet or bicycle frame, comprising:
 a housing configured to it in the palm of a hand, and further includes a slot for attachment to the helmet or bicycle frame, and one or more air vents on respective side surfaces of the housing for cooling the housing during movement of the housing;
 one or more high brightness light-emitting diodes (Hi-LEDs) contained within the housing;
 one or more regular light-emitting diodes (LEDs) contained within the housing;
 electrical circuitry including a processor and a memory, the electrical circuitry contained within the housing and configured to operate the Hi-LEDs and LEDs; and
 two or more user-input interfaces configured to be attachable to an exterior surface of the housing,
 wherein the memory stores two or more brightness level settings for the Hi-LEDs,
 wherein the memory is configured to be reprogrammable by a user to store at least one different brightness level settings for the Hi-LEDs in response to the user operating at least one of the user-input interfaces,
 wherein the memory is further configured to store a bicycle mode and a special mode, wherein the bicycle mode comprises the two or more brightness levels, and wherein the special mode comprises one or more user-selectable flash modes, walking modes and an emergency mode to flash an encoded request for help.

15. The portable lighting device of claim 14 further comprising:
 a port configured to receive a connector attached to a battery pack.

16. The portable lighting device of claim 15 further comprising:
 a battery pack configured to be connectable to the port and further configured to supply power to the portable lighting device.

17. The portable lighting device of claim 14, wherein the one or more LEDs are configured to indicate the selected brightness level of the Hi-LEDs, and wherein the maximum lumens of the Hi-LEDs in combination is at least 1500 lumens.

18. The portable lighting device of claim 14, wherein the one or more LEDs are configured to indicate the selected brightness level of the Hi-LEDs, and wherein the maximum lumens of the Hi-LEDs in combination is at least 3000 lumens.

19. The portable lighting device of claim 14, wherein the one or more LEDs are configured to indicate the selected brightness level of the Hi-LEDs, and wherein the maximum lumens of the Hi-LEDs in combination is between 1 and 1500 lumens.

20. A portable lighting device configured to be attachable to a bicycle frame, comprising:
 a metal housing configured to be removably attached to the bicycle frame and of a size to fit within the palm of a user's hand, and the metal housing further includes a slot for attachment to the bicycle frame, and one or more air vents in the metal housing to provide air flow to an interior of the metal housing for cooling;
 a pair of high brightness light-emitting diode sets (Hi-LEDs) are contained within the metal housing to project light from a front surface of the metal housing, while being cooled by air flow from the one or more air vents, one of the pair of Hi-LEDs is configured to provide a far light beam and the other of the pair of Hi-LEDS is configured to provide a wide light beam, the Hi-LEDs provide at least 1500 lumens;
 a plurality of regular light-emitting diodes (LEDs) are contained within the metal housing to project light from an upper exterior surface of the metal housing;
 a battery pack configured to be removably attached to the bicycle frame and a flexible elongated cable attached to the battery pack and to the metal housing to provide a source of power remote from the metal housing;
 electrical circuitry including a processor and a memory, the electrical circuitry is contained within the metal housing for receiving power from the battery pack and is configured to operate respectively the Hi-LEDs and the regular LEDs, wherein the metal housing can dissipate heat from an exterior surface; and
 two user-input interfaces are mounted on the upper exterior surface of the metal housing adjacent the regular LEDs, the processor is configured to receive input signals from the two user-input interfaces to activate the regular LEDs to provide an indication of the status of the user's inputs,
 wherein the memory is configured to be reprogrammable by a user to store different brightness level settings for the Hi-LEDs in response to the user operating at least one of the user-input interfaces,
 wherein one of the user-input interfaces includes a button configured to incrementally adjust the brightness of the selected light setting in a first direction towards 100% of a maximum light setting in response to determining that the user is pressing and holding the button, and
 wherein the button is configured to incrementally adjust the brightness of the selected light setting in a second direction towards a minimum light setting in response to determining that the user is pressing and holding the button for a predetermined time period.

* * * * *